United States Patent
Venugopalan et al.

(10) Patent No.: US 11,501,289 B2
(45) Date of Patent: Nov. 15, 2022

(54) COMPUTER SYSTEM AND COMPUTER-IMPLEMENTED METHOD FOR SECURE PAYMENT TRANSACTION

(71) Applicant: Mastercard International Incorporated, Purchase, NY (US)

(72) Inventors: Vijin Venugopalan, Singapore (SG); Manu Dharmaiah Kallugudde, Maharashtra (IN); Saket Bhardwaj, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 244 days.

(21) Appl. No.: 16/422,208

(22) Filed: May 24, 2019

(65) Prior Publication Data

US 2019/0392430 A1    Dec. 26, 2019

(30) Foreign Application Priority Data

Jun. 21, 2018   (SG) .......................... 10201805337Y (51) Int. Cl.
*G06Q 20/36* (2012.01)
*G06Q 20/40* (2012.01)
(Continued)

(52) U.S. Cl.
CPC ....... *G06Q 20/3674* (2013.01); *G06Q 20/108* (2013.01); *G06Q 20/20* (2013.01); *G06Q 20/401* (2013.01); *G06Q 20/42* (2013.01)

(58) Field of Classification Search
CPC ............. G06Q 20/3674; G06Q 20/108; G06Q 20/401; G06Q 20/42; G06Q 20/206; G06Q 20/4014; G06Q 20/227
See application file for complete search history.

(56) References Cited

U.S. PATENT DOCUMENTS 6,327,578 B1 *  12/2001  Linehan ................. G06Q 20/04
                                                                    705/65
8,380,177 B2 *   2/2013  Laracey ............... G06Q 20/108
                                                                   455/414.1
(Continued)

FOREIGN PATENT DOCUMENTS

WO    WO 2004092900 A2 *  4/2003
WO    WO 2012150491 A1 *  4/2012  ............. G06Q 20/10

OTHER PUBLICATIONS

Georges Ataya, PCI DSS audit and compliance, Information Security Technical Report, vol. 15, Issue 4, 2010.*

*Primary Examiner* — Steven S Kim
(74) *Attorney, Agent, or Firm* — Leason Ellis LLP (57) ABSTRACT

A computer implemented system and method is disclosed for providing a secure payment transaction between a customer and a merchant. The system includes at least a computer processor and a data storage device, the data storage device comprising instructions operative by the processor to: receive, from an acquirer bank of the merchant, a payment request comprising a payment instrument associated with a customer and a merchant token associated with a merchant, map the merchant token to predefined parameters established by the merchant for performing a merchant authorisation of the payment request, validate the merchant token by checking whether the predefined parameters are met for the payment request, approve or refuse the payment request based on the validation and, if approved, transmit a payment authorisation request to an issuer bank associated with the payment instrument of the customer for issuer authorisation of the payment request and proceed with the secure payment transaction if the issuer authorisation is successful.

17 Claims, 8 Drawing Sheets

(51) Int. Cl.
*G06Q 20/42* (2012.01)
*G06Q 20/10* (2012.01)
*G06Q 20/20* (2012.01)

(56) References Cited

U.S. PATENT DOCUMENTS

| | | | | |
|---|---|---|---|---|
| 2004/0230539 | A1* | 11/2004 | Praisner | G06Q 20/383 705/74 |
| 2008/0147550 | A1* | 6/2008 | Morsillo | G06Q 20/40 705/44 |
| 2009/0240620 | A1* | 9/2009 | Kendrick | G06Q 20/3821 705/39 |
| 2010/0106611 | A1* | 4/2010 | Paulsen | G06Q 20/102 705/26.1 |
| 2010/0121767 | A1* | 5/2010 | Coulter | G06Q 20/401 705/17 |
| 2010/0145860 | A1* | 6/2010 | Pelegero | G06Q 20/00 705/71 |
| 2010/0169314 | A1* | 7/2010 | Green | G06F 16/951 707/E17.014 |
| 2012/0036073 | A1* | 2/2012 | Basu | G06Q 20/42 705/44 |
| 2012/0323735 | A1* | 12/2012 | Montero et al. | G06Q 30/06 705/26.41 |
| 2013/0212006 | A1* | 8/2013 | Siddens | G06Q 20/381 705/39 |
| 2013/0218758 | A1* | 8/2013 | Koenigsbrueck | G06Q 40/02 705/39 |
| 2013/0238455 | A1* | 9/2013 | Laracey | G06Q 20/108 705/21 |
| 2013/0346311 | A1* | 12/2013 | Boding | G06Q 20/4016 705/44 |
| 2014/0040144 | A1* | 2/2014 | Plomske | G06Q 20/38215 705/64 |
| 2014/0074605 | A1* | 3/2014 | Sanchez | G06Q 20/321 705/14.64 |
| 2014/0074637 | A1* | 3/2014 | Hammad | G06Q 20/351 705/21 |
| 2014/0372308 | A1* | 12/2014 | Sheets | G06Q 20/40 705/44 |
| 2015/0112870 | A1* | 4/2015 | Nagasundaram et al. | G06Q 20/3821 |
| 2015/0120428 | A1* | 4/2015 | Hardison | G06Q 30/0238 705/14.33 |
| 2015/0142673 | A1* | 5/2015 | Nelsen | G06Q 20/405 705/76 |
| 2015/0287031 | A1* | 10/2015 | Radu | G06Q 20/20 705/18 |
| 2015/0379508 | A1* | 12/2015 | Van | G06Q 20/38215 705/44 |
| 2016/0078428 | A1* | 3/2016 | Moser et al. | G06Q 20/367 |
| 2016/0232501 | A1* | 8/2016 | Unser | G06Q 20/20 |
| 2017/0300880 | A1* | 10/2017 | Gilbey | G06Q 20/325 |
| 2017/0330181 | A1* | 11/2017 | Ortiz | G06Q 30/0226 |
| 2019/0087815 | A1* | 3/2019 | Goldschmidt | G06Q 20/36 |
| 2020/0410483 | A1* | 12/2020 | Dill | H04L 9/32 |

* cited by examiner

COMPUTER SYSTEM AND COMPUTER-IMPLEMENTED METHOD FOR SECURE PAYMENT TRANSACTION

CROSS-REFERENCE TO RELATED PATENT APPLICATIONS

The present application claims priority under 35 U.S.C. § 119 to Singapore Patent Application No. 10201805337Y, filed Jun. 21, 2018, the entire contents of which is incorporated by reference herein as if expressly set forth in its respective entirety herein.

FIELD OF THE INVENTION

The present invention generally relates to processing of a digital payment transaction. In particular, the present invention relates to a secure payment transaction with increased security for merchants.

BACKGROUND OF THE INVENTION

In today's digital world every aspects of life is going digital. There is no exception for payment transactions. A digital payment system (also referred to as an electronic payment system) has become popular over physical cash transactions due to increased convenience and reduced processing time.

The payments industry is moving towards providing better user experience for both customers and merchants by providing various new solutions, such as near field communications (NFC)—Tap and pay, payments through digital wallets, card-on-file transactions, in-app transactions and many other digital channels.

Digital payment systems have now crossed all boundaries. Plastic payment cards have moved into consumer mobile phones, hand held devices and many other devices, for example, wearables, keys and so on, which has enabled payment transactions from homes, on the go, from car dash board and from any other connected Internet of Things (IoT) devices.

At present, there are various ways to digitize payment cards and perform digital payments. Tokenisation takes first position when it comes to payment security and user experience. Tokenisation allows consumers to digitize their existing physical payment cards into secure digital payment cards, protecting their sensitive card or account information from fraud, which can be stored on their mobile phones, hand-held devices, wearables, Internet of Things (IoT) devices and can be used conveniently for payment transactions.

Despite many advantages, security has become a primary concern for various kinds of digital payments due to inherent use of internet and open networks. This makes digital payments vulnerable to different security threats and cyber-attacks.

Payment security is not only a matter of concern for the user or the customer but also for merchants. With changing technology, the merchants too have started accepting various payment channels in order to survive increased competition. However, managing various payment channels becomes very difficult at times for the merchants, especially the payment security. Existing payment methods generally provide security at the issuer level or at the acquirer or payment aggregator level. The merchants have very basic controls on the payment security check. This creates dependency of the merchants on the issuer banks and the acquirer banks to ensure transaction security. Merchants are left with no other options than to trust the issuer or the acquirer or the consumer and their security methods to prevent fraud. Not only for digital payments, fraud may even occur at a physical payment terminal. Irrespective of the payment channel, any payment fraud may result in incurring losses and various other damages to merchants. With the changing technology and introduction of new payment methods there is therefore a need to better engage merchants in payment security.

In view of the above discussion, it may be realized that there exists a need to provide enhanced security checks at the merchant level.

It is therefore an object of the present invention to provide a computer system and computer-implemented method for a secure payment transaction.

SUMMARY OF THE INVENTION

In general terms, the present disclosure proposes a computer system and computer-implemented method for providing a secure payment transaction between a customer and a merchant.

In a first aspect of the present invention, there is provided a computer implemented system for providing a secure payment transaction between a customer and a merchant, the system comprising at least a computer processor and a data storage device, the data storage device comprising instructions operative by the processor to:

receive, from an acquirer bank of the merchant, a payment request comprising a payment instrument associated with a customer and a merchant token associated with a merchant, map the merchant token to predefined parameters established by the merchant for performing a merchant authorisation of the payment request, validate the merchant token by checking whether the predefined parameters are met for the payment request, approve or refuse the payment request based on the validation and, if approved, transmit a payment authorisation request to an issuer bank associated with the payment instrument of the customer for issuer authorisation of the payment request, and proceed with the secure payment transaction if the issuer authorisation is successful.

Embodiments of the invention may therefore advantageously provide enhanced security to merchants for a digital payment transaction. The enhanced security may be provided by including a two-stage authorisation process—one being a merchant authorisation stage and the other being the issuer bank authorisation stage.

In some embodiments, the payment instrument identifies one of a debit card, credit card, digital wallet, or virtual payment card.

In some embodiments, the merchant token may be generated at least based on a merchant identifier and one or more payment channels available for the payment transaction. Further, the merchant token may comprise permitted values of the predefined parameters established by the merchant upon generation of the merchant token.

In some embodiments, the predefined parameters established by the merchant may comprise one or more of: maximum transaction value, transaction location, number of allowed transactions in a predefined period of time, maximum total value of transactions, permitted age of the customer for making the payment transaction, permitted countries for initiating the payment transaction.

In some embodiments, the one or more payment channels may comprise POS (Point-of-Sale), e-commerce, m-commerce, QR, contactless, DSRP (Digital Secure Remote Payment).

In some embodiments, the payment authorisation request by the issuer bank may comprise checking customer credentials associated with the payment instrument with pre-registered customer details.

In some embodiments, the customer credentials associated with the payment instrument may comprise one or more of card number, customer name, expiry date, CVV (Card Verification Value), PIN (Personal Identification Number), OTP (One Time Password), 3D secure PIN.

In some embodiments, the computer implemented system may comprise a tokenisation module for generation of the merchant token.

In some embodiments, the tokenisation module may be communicatively coupled with a merchant token generation interface provided to the merchant for requesting token generation.

In some embodiments, the computer implemented system may comprise a database module for storing the merchant token.

In a second aspect of the present invention, there is described a computer-implemented method for processing a secure payment transaction between a customer and a merchant. The method comprises:
  receiving from an acquirer bank of the merchant, a payment request comprising a payment instrument associated with a customer and a merchant token associated with a merchant,
  mapping the merchant token to predefined parameters established by the merchant for performing a merchant authorisation of the payment request,
  validating the merchant token by checking whether the predefined parameters are met for the payment request,
  approving or refusing the payment request based on the validation and, if approved, transmit a payment authorisation request to an issuer bank associated with the payment instrument of the customer for issuer authorisation of the payment request, and
  proceeding with the secure payment transaction if the issuer authorisation is successful.

Embodiments of the invention advantageously provide a computer-implemented method for processing a secure payment transaction between a customer and a merchant with enhanced security for the merchant. The merchant may advantageously have flexibility to configure different security parameters for different transaction channels. The merchant may manage an existing configuration or add new payment channels for enhanced security.

In some embodiments, the computer implemented method may comprise initiating the payment request by the customer with the merchant at one of a merchant POS terminal, a web portal or a mobile portal of the merchant.

In some embodiments, the computer implemented method may further comprise receiving the payment request at the acquirer bank of the merchant based on a customer payment initiation and sending the payment request to a payment network system at least including a tokenisation module.

In some embodiments, the mapping of the merchant token may be performed by the tokenisation module. More specifically, the mapping may comprise de-tokenising the merchant token to identify the merchant identifier and, optionally, a payment channel available for the payment transaction.

In some embodiments, the validating the merchant token may further comprise comparing the predefined parameters associated with the merchant token with permitted values of the predefined parameters as established by the merchant upon generation of the merchant token.

In some embodiments, the approving or refusing the payment request may further comprise:
  providing a full approval if all the predefined parameters are met;
  providing a partial approval if one or more of the predefined parameters require further checking by the issuer bank; and
  providing a refusal if one or more of the predefined parameters is not met.

In some embodiments, the issuer authorisation may comprise checking customer credentials associated with the payment instrument with pre-registered customer details by the issuer bank.

In some embodiments, the computer implemented method may further comprise providing a merchant token generation interface to the merchant for allowing the merchant to generate and manage the predefined parameters associated with the merchant token.

In a third aspect of the present invention, there is provided a non-transitory computer-readable medium having stored thereon program instructions for causing at least one processor to perform the method according to the second aspect of the invention.

Other desirable features and characteristics will become apparent from the subsequent detailed description and the appended claims, taken in conjunction with the accompanying drawings of the disclosure. Moreover, within the scope of this proposed disclosure it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Non-limiting embodiments of the invention will now be described for the sake of example only, with reference to the following drawings in which.

DETAILED DESCRIPTION OF THE EMBODIMENT

As used herein, the term "account" refers to any form of arrangement that a customer has with an institution that allows the customer to deposit and/or withdraw funds. An account can be a deposit account, a credit card account, a debit card account, a current account, a saving account, an overdraft account, an electronic wallet account or any other type of account offered by the institution. Furthermore, the account may be a loan account in which case the customer owes money to the institution. In some embodiments, an account may be associated with a payment card, such as a credit card, a debit card, a prepaid card, a charge card, a membership card, a promotional card, a frequent flyer card, an identification card, a prepaid card, a gift card, and/or any other device that may hold account information, such as mobile phones, smartphones, personal digital assistants (PDAs), key fobs, transponder devices, near field communication (NFC)-enabled devices, and/or computers.

The term "institution" is not necessarily limited to organizations which are legally constituted as banks, since in some jurisdictions other organizations may be permitted to maintain accounts. For example, an institution associated with an acquirer or an issuer can be one of the following: a bank, a financial technology company, or a financial institution.

The terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Embodiments of the present invention aim at providing an enhanced level of security check in processing of payment transactions by providing merchants with security options to protect themselves from fraud. The merchants can protect themselves from physical frauds at POS terminals and digital frauds through web or mobile portals with the help of embodiments of the present invention. In order to achieve this object, embodiments of the present invention provide a computer system and method for providing a secure payment transaction between a customer and a merchant with an additional security check at the merchant end.

Figure 1:
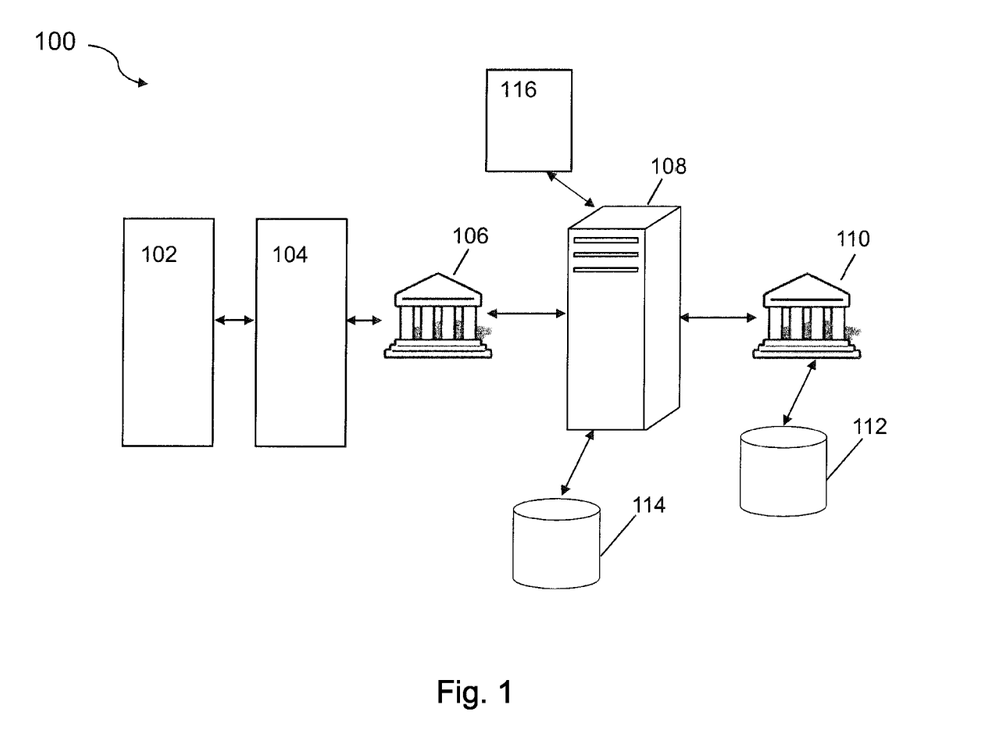
FIG. 1 shows a computerised network for processing a payment transaction with an additional level of authorisation at the merchant side by a payment network server according to one embodiment of the present invention.

FIG. 1 schematically illustrates such a digital payment network 100 with an additional level of merchant authorisation according to one embodiment of the present invention. The digital payment network 100 includes a merchant server 104 connected to a payment service provider server 108 (also referred to as a payment network server in the present description) through an acquirer server 106. The merchant server 104 is arranged to be connected with a plurality of payment terminals 102 of the merchant. For example, the merchant server 104 may be connected to a plurality of POS terminals disposed at different locations of the merchant stores. The merchant server 104 also may be connected to a web portal and/or a mobile portal of the merchant for enabling online payment options. The acquirer server 106 maintains a merchant account and collects the payment on the merchant account. The payment service provider 108, on the other hand, is connected to an issuer server 110. The issuer server 110 maintains a customer account and issues a payment card to him based on his credentials. It should be understood that a typical payment service provider 108 may be connected to a plurality of issuer servers 110 and a plurality of merchant servers 104. Typical examples of the payment service providers include MasterCard, VISA, American Express and so on. In the present embodiment, the issuer server 110 is connected to a database 112 and the payment service provider server 108 is connected to a database 114. Further, the payment service provider server 108 is communicatively coupled to a token generation interface 116 provided to the merchant by the payment service provider server 108 as an improvement to implement the additional security check at the merchant level according to the present invention.

Typically, a digital payment transaction is initiated by a customer when he presents his payment card at a POS terminal or provides his card details on a merchant web or mobile portal 102. The merchant server 104 then sends the customer details and transaction details to the payment service provider server 108 via the acquirer server 106. The payment service provider server 108 forwards the details to the issuer server 110 associated with the payment card of the customer for payment authorisation. After successful authorisation from the issuer server 110, the payment is completed by debiting the transaction amount from the customer account by the issuer server 110 and crediting the merchant account maintained by the acquirer server 106 of the merchant. Embodiments of the present invention, however, disclose an additional level of authorisation at a merchant level apart from the issuer level authorisation (mentioned above) thereby ensuring a more secure digital payment transaction when compared to existing techniques.

Figure 2:
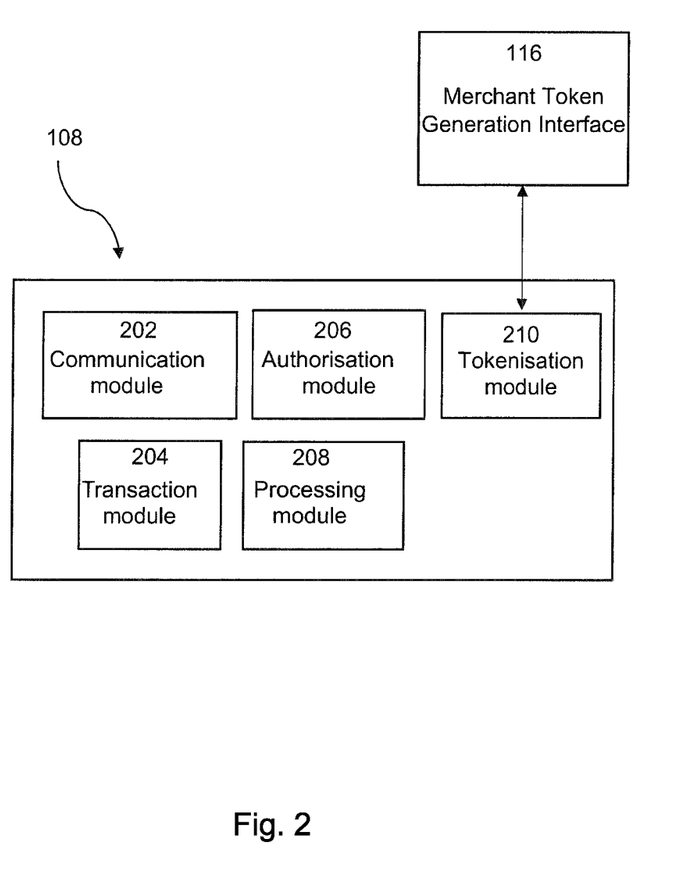
FIG. 2 shows a detailed configuration of the payment network server of FIG. 1 with an additional level of merchant authorisation.

FIG. 2 illustrates a detailed configuration of the payment service provider server 108 which performs the additional level of merchant authorisation. The payment service provider server 108 includes a communication module 202, a transaction module 204, an authorisation module 206, and a processing module 208. The communication module 202 is configured to enable the payment service provider server 108 to communicate with at least the acquirer server 106 and the issuer server 110. In some embodiments, the communication module 202 may be configured to communicate directly with the merchant server 104.

The transaction module 204 is configured to work in connection with the communication module 202 to receive a payment request. Further, the transaction module is configured to debit a payment amount from the customer account via the issuer server 110 and to credit the merchant account via the acquirer server 106.

The processing module 208 is configured to process the payment request by identifying a customer identifier with a customer payment card account identifier and arranging necessary verification for the payment transaction.

The authorization module 206 is configured to forward an issuer authorization request to the issuer server 110 and to receive an issuer authorization response indicating whether the payment request is authorized or refused by the issuer server 110.

Additionally, the payment service provider server 108 includes a tokenisation module 210 according to the present embodiment. As shown in FIG. 2 the tokenisation module (also referred as a tokenisation platform) is communicatively coupled to the merchant token generation interface 116. The tokenisation module 210 may be coupled with the merchant token generation interface 116 by wired or wireless communication protocol. In some embodiments, the wireless communication may include an internet network connected through a web server interface.

Figure 3:
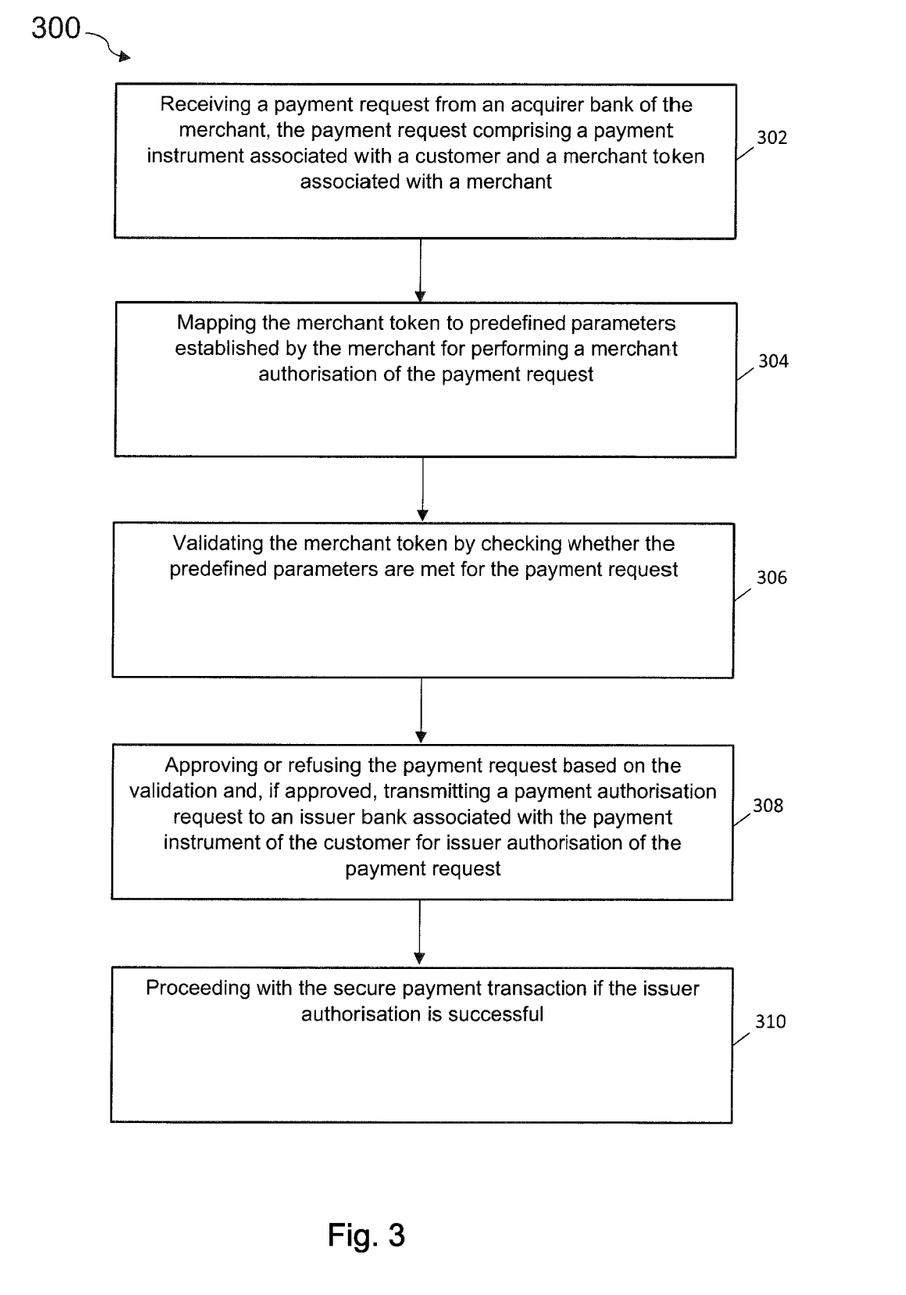
FIG. 3 illustrates a two stage authorisation process managed by the payment network server of FIG. 2 for the processing of a payment transaction using the network of FIG. 1.

FIG. 3 is a flowchart illustrating the two-stage authorisation process 300 performed by the payment service provider server 108 to ensure the secure payment transaction. Once a digital payment request is initiated by a customer upon presenting a payment card at a merchant POS terminal or web or mobile portal 102 of the merchant, the merchant server 104 receives a payment request from an acquirer bank of the merchant including at least including the customer credentials (i.e. details of a payment instrument associated with the customer) and a merchant token associated with the merchant, at step 302. The payment instrument may be, for example, a debit card, a credit card, a pre-loaded card, a digital payment card and so on. Physical payment cards typically include a magnetic strip or a semiconductor chip. The merchant POS terminal typically includes a necessary reader for the magnetic strip or semiconductor chip or necessary wireless technology for contactless payment. The POS terminal may, for example, use RFID (Radio Frequency Identification), NFC or other known wireless technology for the contactless transactions. The customer credentials may include customer name, payment card number, PIN (Personal Identification Number), expiry date, CVV (Card Verification Value) number, OTP (One Time Password), 3D secure password and so on. In one embodiment, the customer may use a digital card including a tokenized card number for online transactions through the merchant web and mobile portal 102 (a method of tokenisation of the customer payment card and method of processing a payment transaction using the tokenised payment card is described in a later section with reference to FIG. 4). The tokenised card number may be de-tokenised at a later stage of the payment transaction by the payment service provider server 108.

In the present embodiment, in addition to the customer credentials, the payment request sent by the merchant server 104 also includes the merchant token for an additional level of authorisation at a merchant side. The merchant may subscribe for an additional merchant authorisation service with the payment service provider server 108. In case the merchant has already subscribed to this service, at the stage of initialization of the payment transaction by the customer, by default the merchant token is transmitted to the payment service provider server 108 along with the customer credentials. After receiving the customer credentials and the merchant token, the merchant server 104 sends them to the payment service provider server 108 for payment authorisation via the acquirer server 106.

At stage 304, the payment service provider server 108 maps the merchant token with certain predefined parameters specified by the merchant for performing a merchant authorization of the payment request. This mapping may comprise de-tokenising the merchant token by mapping it using a database or the like to a merchant identifier and, optionally, a payment channel available for the payment transaction.

Next at step 306, the payment service provider server 108 determines if the merchant token is valid by checking whether the predefined parameters are met for the payment request. Thus, upon identification of the merchant, the payment service provider server 108 checks if the predefined parameters associated with the merchant token meet the requirement of permitted values set by the merchant at a token generation stage. If details related to the payment request are found to meet the predefined parameters associated with the merchant token, the payment request is validated with merchant authorisation and is forwarded to the issuer server 110 for issuer authorisation at step 308. If the details of the payment request do not match the predefined parameters associated with the merchant token, the payment service provider server 108 may refuse the payment request at this stage. Further, for partial match of the predefined parameters or if the tokenisation module is unable to perform a full verification, a partial approval may be transmitted to the issuer server 110 for further processing of the verification of the remaining parameters.

At a stage of issuer authorisation, the issuer server 110 checks the customer credentials associated with the payment card account identifier. If the customer credentials match with the pre-registered customer details, then the issuer server 110 approves the payment request and transmits the issuer authorisation approval to the payment service provider server 108 and requests to proceed with the payment transaction at step 310. In an event that the customer credentials do not match with the pre-registered customer details, the issuer server 110 may refuse the payment request.

The present embodiment described in FIG. 3 shows the merchant authorisation is performed at a first stage and the issuer authorisation is performed at a second stage. However, it should be understood that any order of the two authorisations is possible for successful implementation of embodiments of the present invention. For example, the issuer authorisation may be performed at a first stage followed by the merchant level verification. In another exemplary embodiment, it may be possible to associate weightage on the predefined parameters attached to the merchant token. Validation of predefined parameters with higher weightage may be strictly required for the full approval or partial approval of the merchant authorisation. Certain other parameters may be set with lower weightage and a flexible check may be performed with respect to such predefined parameters so as to accept slight deviation of them from the predefined permitted values.

Further, in another embodiment of the invention, the payment service provider server 108 may send a notification to the merchant server 104 on the outcome of a transaction validation or merchant authorisation, such as at full approval, partial approval and refusal. The notification may be sent via a known media of communication such as sms (short message services) text message, push notification, email notification and any combination of these.

Figure 4A:
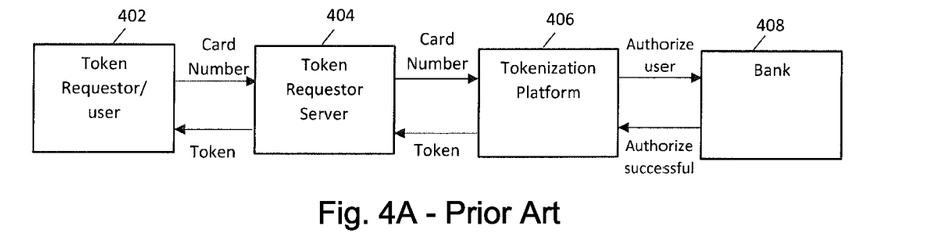
FIG. 4A shows a prior art method of tokenisation of the customer payment card and FIG. 4B shows a prior art method of processing a payment transaction using the tokenised payment card.
Figure 4B:
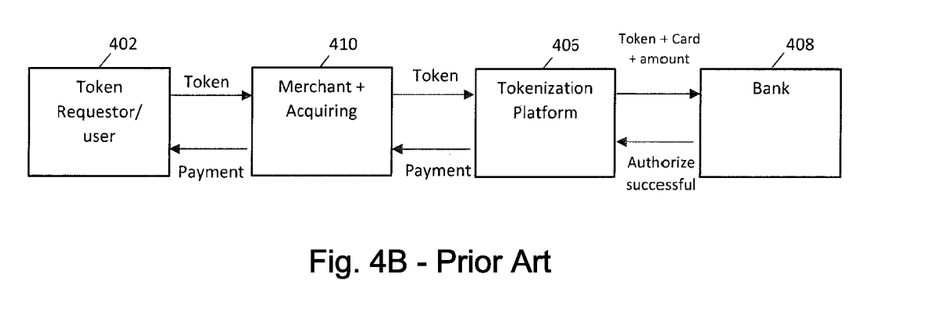

To ensure secure digital payment, the technique of tokenisation is well known in the art which advantageously protects a customer's important and sensitive account information from fraud. FIG. 4A briefly illustrates such a prior art method of tokenisation of a customer payment card and FIG. 4B shows a method of processing a payment transaction using the tokenized payment card as known in the art. An interested customer 402 may request for tokenisation of his physical payment card with a tokenisation service provider 404. The tokenisation service provider 404 transmits such a tokenisation request to a tokenisation platform 406 (also referred as tokenisation module) of a payment network server (e.g. server 108). The tokenisation platform of the payment network server then transmit the customer card details for an authorisation from an issuer server 408 associated with the customer payment card. After successful issuer authorisation of the customer information, a tokenised digital payment card is provided to the customer 402 by the tokenisation platform 406 of the payment network server via the tokenisation service provider 404. The tokenised digital payment card is essentially a substitute number or code mapped to the customer payment card and used in its place to ensure the customer payment card details are not exposed for potential fraud.

The same tokenised digital payment card can be used by the customer 402 for performing a digital payment transaction as shown in FIG. 4B. Upon a payment request at a merchant terminal or portal, the merchant server in combination with an acquirer server 410 sends a payment request comprising the transaction amount and the tokenised digital payment card to the tokenisation platform 406 of the payment network server. The payment network server typically requests for the issuer authorisation from the issuer bank server 408. After successful completion of the issuer authorisation, the payment request approval is transmitted and payment transaction is completed by the network service provider 406 with the help of the acquirer server and the merchant server 410.

Figure 5A:
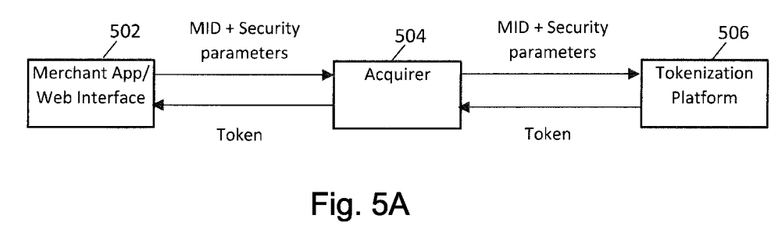
FIG. 5A shows a method of merchant token generation and FIG. 5B shows a method of processing a payment transaction having an additional level of merchant authorisation according to the present embodiment.
Figure 5B:
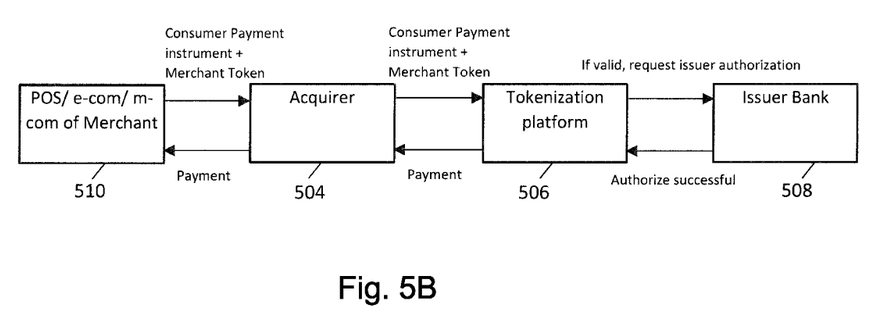

In order to provide secure digital payment processing, the present embodiment provides an additional authorisation service at a merchant level by offering a tokenisation service to the merchants. FIG. 5A illustrates a method of merchant token generation and FIG. 5B shows a method of processing a payment transaction having an additional level of merchant authorisation according to the present embodiment. If the merchant subscribes to the additional authorisation service, the payment service provider server 108 provides the token generation interface 116, 502 to the merchant. The token generation interface 116, 502 allows the merchant to generate and modify the merchant token. The token generation interface 116, 502 may be coupled to the tokenisation module 210, 506 of the payment service provider server 108 through an acquirer server 504 for generation of the merchant token. Although the present embodiment describes the token generation interface 116, 502 as a web interface, it should be understood that any variation thereof, for example, mobile application, telephone interface, kiosk, local network connection and so on, may be used as an alternative for the possible implementation of the present embodiment. An example of the tokenisation module 506 (or tokenisation platform) may include MDES (MasterCard Digital Enablement Services) provided by MasterCard.

A merchant who has subscribed for an additional authorisation service with the payment service provider server 108 may request for generation of a merchant token with the merchant token generation interface 116, 502. In the present embodiment, the merchant token is generated based on a merchant identifier and a type of a payment channel. The merchant identifier may include a merchant category code (MCC). A customer may use various payment channels for making the payment transaction. Examples of such payment channels include POS terminal, e-commerce, m-commerce, contactless transaction and so forth. Further, different parameters associated with the merchant may also be associated with the merchant token. The different parameters may include maximum transaction value, transaction location, number of permitted transactions within a time period such as per day, per week etc., maximum total value, allowed age of the customer, allowed countries for initiation of a payment transaction and so forth. Upon receiving a request for generation of merchant token from the merchant, the acquirer server 504 sends such request to the tokenisation platform or module 506 for verification of such information associated with the requesting merchant. Upon successful verification of the information associated with the merchant, the tokenisation platform 506 may generate the unique merchant token corresponding to the merchant. Then the merchant token is sent back to the merchant by the tokenisation platform 506 via the acquirer server 504.

As shown in FIG. 5B, the subscriber merchant sends a payment request initiated at a merchant POS/e-portal/m-app 510 (comprising at least a customer payment instrument and the merchant token) to the tokenisation platform 506 of the payment network server via the acquirer server 504. The tokenisation platform 506 performs a first level check for merchant authorisation. Then, a second level check is performed by an issuer server 508 associated with the customer payment instrument. After successful authorisation at both levels, the payment request is proceeded for completion. The two level authorisations including tokenisation of the merchant data as disclosed in the present invention provides secure digital payment transaction along with protection of sensitive merchant account data from frauds.

A customer may initiate a payment request at the merchant POS or at e-portal or m-app 510, as shown in FIG. 5B using his payment instrument. The payment instrument of the customer may be a debit card, a credit card, a pre-paid card, a digital payment card and so on. If the merchant is a subscriber to the additional authorisation service, the payment request sent from the merchant terminal 510 to the acquirer server 504 contains the information of the customer payment instrument and the merchant token. The merchant token may comprise or be associated with the pre-defined parameters set by the merchant. The acquirer server 504 then sends the payment request including the customer payment instrument information and the merchant token to the tokenisation platform 506 for merchant authorisation. At this stage, the tokenisation platform 506 validates if the pre-defined parameters associated with the merchant match with the parameter values of the payment request. On successful merchant authorisation, the tokenisation platform 506 forwards the payment request to the issuer sever 508 for issuer authorisation of the customer payment instrument. After the issuer server 508 successfully authorises the issuer authorisation, the payment request is proceeded to the tokenisation platform 506 for payment completion. The payment request is then completed by the payment service provider server 108 with the help of the acquirer server 504 and the issuer server 508 to debit the customer account by the transaction amount and credit the merchant account with the amount, as shown in FIG. 5B.

Figure 6:
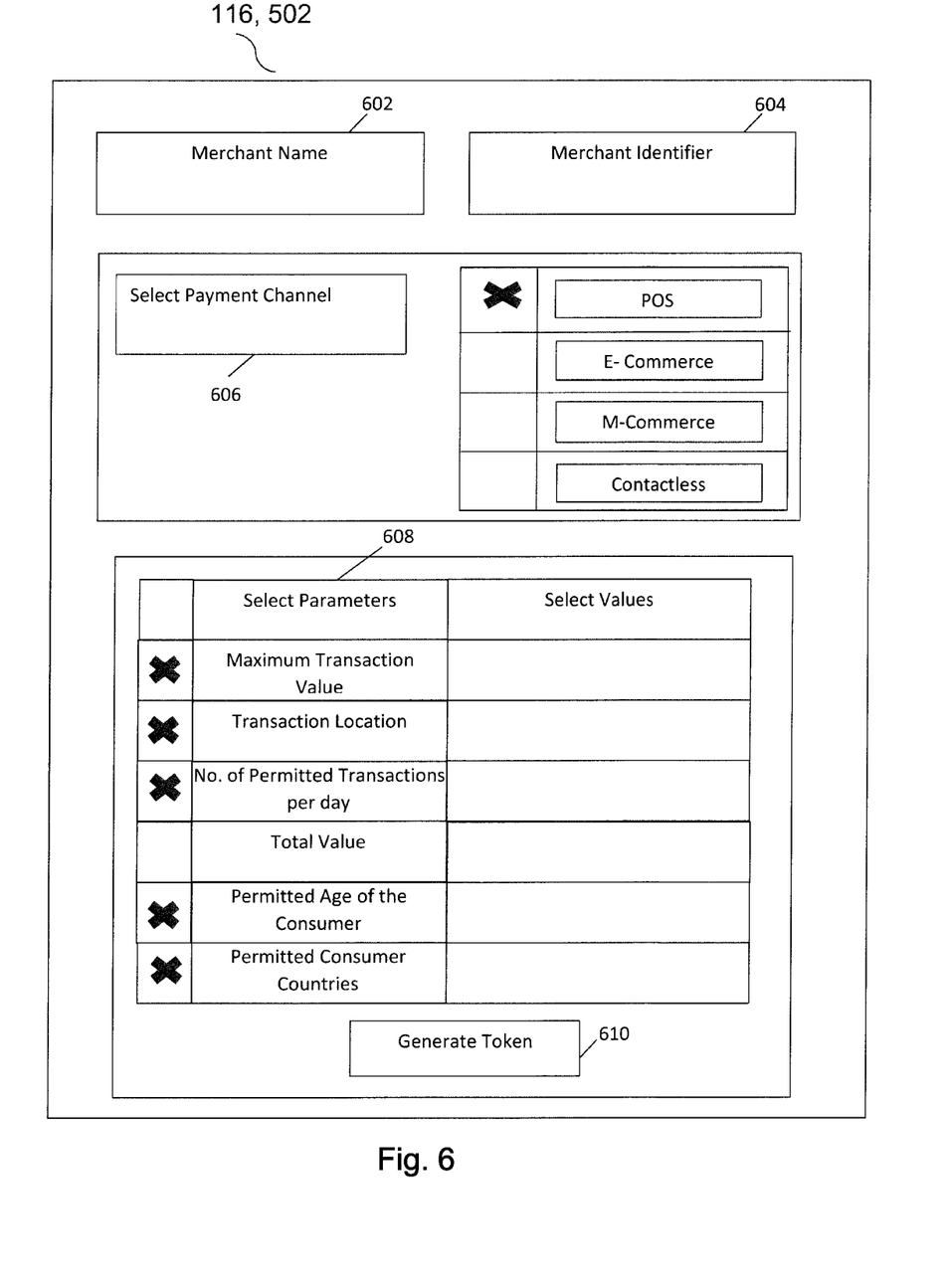
FIG. 6 schematically shows a merchant token generation interface provided to a merchant by the payment network server of FIG. 2.

FIG. 6 schematically shows a merchant token generation interface 116, 502) provided to the merchant by the payment network server or tokenisation platform 506 according to the present embodiment. By using the merchant token generation interface 116, 502, the merchant token can be generated based on merchant defined criteria. In the present embodiment the merchant token is generated based on a merchant name 602 or a merchant identifier 604 and a type of payment channel 606. The merchant identifier 604 may be an identification of the merchant account including a merchant category code (MCC) provided by the payment service provider server 108. The different types of payment channels of the merchant may include POS, web portal, mobile portal, QR, Contactless, DSRP (Digital Secure Remote Payments) and so forth. In some embodiments, different parameters 608 related to the merchant may be associated with the merchant token. The merchant token generation interface 116, 502 may generate a token using a button 610 as shown in FIG. 6. It should be understood that FIG. 6 only illustrates an exemplary embodiment of the merchant token generation interface 116 and there may be other representations of such merchant token generation interface for the successful implementation of embodiments of the present invention.

In some embodiments, different parameters 608 associated with the merchant can be specified by the merchant upon generation of the merchant token at the merchant token generation interface 116, 502. For example, the different parameters may include maximum transaction value, transaction location, number of allowed transactions during a period of time such as per day, per month, per quarter etc., maximum total value, allowed age of the customer, allowed countries for initiating of a payment transaction and so forth. Further, the maximum total value may be calculated by multiplying a value of each transaction and a number of allowed transactions. The merchant may have an option to select one or more of the different parameters 608 for generation of the merchant token. In some embodiments, the merchant may specify a range of permitted values of the selected parameters associated with the merchant for processing a payment transaction.

As explained above, after the merchant subscribes to the tokenisation system such as MDES, the merchant receives its unique token which can be sent during a payment transaction along with the customer credentials. Various payment channels such as POS transaction, e-com transactions, m-com transaction and so on may have separate tokens respectively associated with them. This provides greater flexibility to the merchants to configure different security checking parameters for different payment channels.

In one embodiment of the invention, the following method can be adopted to generate a merchant token:
1. The merchant may use the user interface 116, 502 to create security restrictions and manage them in real time.
2. The merchant may request for enhanced security by considering the below parameters:
a. Merchant identifier and channel combination may be used to generate unique merchant token. The different channels include but are not limited to POS, e-com, m-com, QR, Contactless, DSRP and so on.
b. Various parameters may be associated with each merchant token such as:
  i. Maximum transaction value
  ii. Transaction location
  iii. Number of allowed transactions during a period of time such as per day, per month, per quarter and so on
  iv. Maximum total value=value of each transaction x number of allowed transactions
  v. Allowed age of the customer
  vi. Allowed countries for initiation of a payment transaction
c. The tokenisation module 210 generates a unique token relating to the merchant identifier and payment channel combination. The merchant token is then forwarded to the merchant by any commonly known communication means for example, email, text message over sms, push mail service and so forth. The merchant may use the merchant token during every transaction of the relevant type for additional merchant authorisation.
d. The above parameters can be easily managed by the merchant in real-time through the merchant interface 116, 502 as provided by the tokenisation platform 210 for this purpose.
3. The merchant terminals 102 and other online channels including the merchant server 104, the acquirer server 106, and the payment service provider server 108 may be configured to pass the merchant token during every payment transaction.
4. The customer may initiate the payment transaction at any of the available channels of the merchant such as POS, e-com, m-com, QR, Contactless, DSRP and so on. The payment transaction request may include customer credentials and the merchant token which is forwarded to the payment service provider server 108 via the acquirer server 106.
5. The payment service provider server 108 then forwards the merchant token to the tokenisation module 210 such as MDES for the merchant authorisation.
6. The tokenisation module 210 receives the payment transaction request and validates the transaction for the merchant defined parameters. If the parameters meet the predefined condition established by the merchant, the tokenisation module 210 validates the payment transaction request and forwards to the issuer server 110 for the issuer authorisation of the customer credentials. If the merchant token with the parameter values are found not valid, the transaction may be declined.
7. After the merchant authorisation, the issuer server 110 performs the issuer authorisation of the transaction based on the customer credentials. After successful issuer authorisation, the payment is completed by debiting the transaction amount from the customer account and crediting the same into merchant account.

In one advantage embodiments of the present invention provide enhanced security for merchants. The merchant may advantageously have flexibility to configure different security parameters for different transaction channels. Merchants also can manage existing configurations in real time. New payment methods also can be added and secured instantaneously using the merchant token generation interface. The tokenisation platform such as MDES ensures utmost security for payment transactions which reduces fraud and decline rates at the issuer end.

Figure 7:
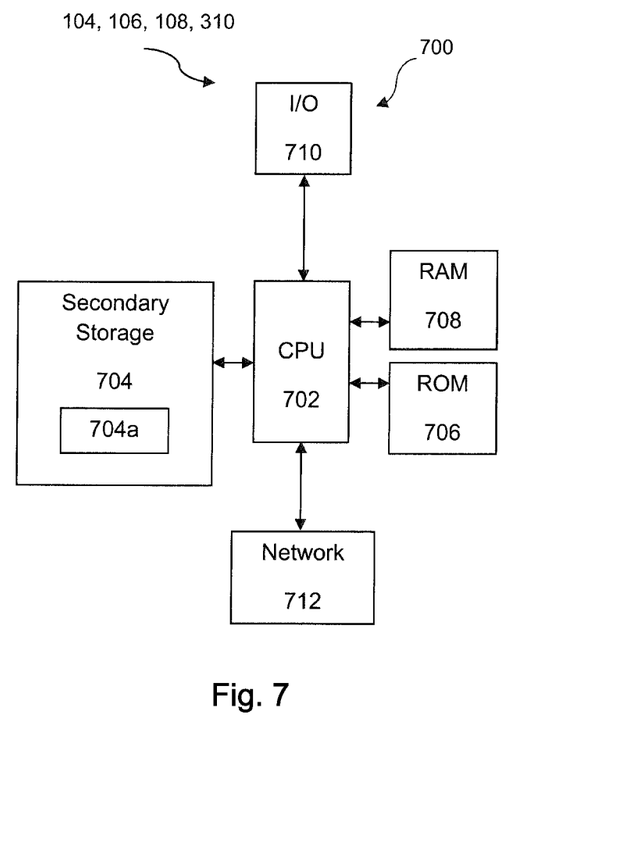
FIG. 7 shows schematically the structure of a server which may be used in the computerised network of FIG. 1 to implement a method in accordance with embodiments of the invention.

FIG. 7 is a block diagram showing a technical architecture 700 of the merchant server 104, the acquirer server 106, the payment network server 108 and/or the issuer server 110.

The technical architecture 700 includes a processor 702 (which may be referred to as a central processor unit or CPU) that is in communication with memory devices including secondary storage 704 (such as disk drives), read only memory (ROM) 706, and random access memory (RAM)

708. The processor 702 may be implemented as one or more CPU chips. The technical architecture may further comprise input/output (I/O) devices 710, and network connectivity devices 712.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution.

In this embodiment, the secondary storage 704 has a processing component 704a comprising non-transitory instructions operative by the processor 702 to perform various operations of the method of the present disclosure. The ROM 706 is used to store instructions and perhaps data which are read during program execution. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), plasma displays, touch screen displays, keyboards, keypads, switches, dials, mice, track balls, voice recognizers, card readers, paper tape readers, or other input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 712 may enable the processor 702 to communicate with the Internet or one or more intranets. With such a network connection, it is contemplated that the processor 702 might receive information from the network, or might output information to the network in the course of performing the above-described method operations. Such information, which is often represented as a sequence of instructions to be executed using processor 702, may be received from and outputted to the network, for example, in the form of a computer data signal embodied in a carrier wave.

The processor 702 executes instructions, codes, computer programs, scripts which it accesses from hard disk, floppy disk, optical disk (these various disk based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 700 to provide the functionality of a number of servers that is not directly bound to the number of computers in the technical architecture 700. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 702, the RAM 708, and the ROM 706 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 8:
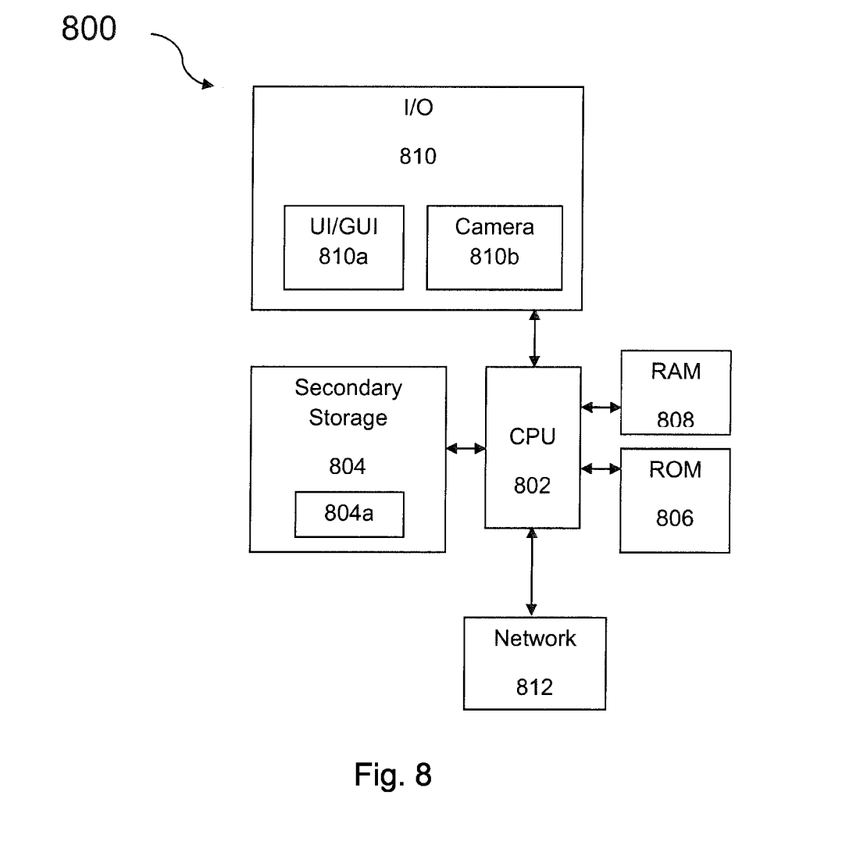
FIG. 8 shows schematically the structure of a communication device which may be used in the computerised network of FIG. 1 to implement a method in accordance with embodiments of the invention.

FIG. 8 is a block diagram showing a technical architecture 800 of a communication device (e.g. a customer electronic device and/or wearable device of the customer). The technical architecture includes a processor 802 (which may be referred to as a central processor unit or CPU) that is in communication with memory devices including secondary storage 804 (such as disk drives or memory cards), read only memory (ROM) 806, and random access memory (RAM) 808. The processor 802 may be implemented as one or more CPU chips. The technical architecture further comprises input/output (I/O) devices 810, and network connectivity devices 812.

The I/O devices 810 comprise a customer interface (UI) 810a and a camera 810b. The UI 810a may comprise a screen in the form of a touch screen, a keyboard, a keypad or other known input device. The camera 810b is a device for recording visual images in the form of photographs, film or video signals. The UI 810a may be configured to operate with the processor 802 together with the memory devices 804, 806, 808 in conjunction with the network connectivity devices 812 to display to the customer an authentication request requesting for a customer authentication identifier to be input via the I/O devices 810. The customer authentication identifier may be input via the UI 810a or the camera 810b (e.g. if the customer authentication identifier is associated with a biometric identifier).

The secondary storage 804 is typically comprised of a memory card or other storage device and is used for non-volatile storage of data and as an over-flow data storage device if RAM 808 is not large enough to hold all working data. Secondary storage 804 may be used to store programs which are loaded into RAM 808 when such programs are selected for execution.

In this embodiment, the secondary storage 804 has a processing component 804a, comprising non-transitory instructions operative by the processor 802 to perform various operations of the method of the present disclosure. The ROM 806 is used to store instructions and perhaps data which are read during program execution. The secondary storage 804, the RAM 808, and/or the ROM 806 may be referred to in some contexts as computer readable storage media and/or non-transitory computer readable media.

The network connectivity devices 812 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 812 may enable the processor 802 to communicate with the Internet or one or more intranets. With such a network connection, it is contemplated that the processor 802 might receive information from the network, or might output information to the network in the course of performing the above-described method operations. Such information, which is often represented as a sequence of instructions to be executed using processor 802, may be received from and outputted to the network, for example, in the form of a computer data signal embodied in a carrier wave. In embodiments, the network connectivity devices 812 enable the customer electronic device and the customer wearable device to be communicatively connected to each other. The network connectivity devices 812 may also enable the customer electronic device to be in communication with the merchant server 104 and/or the payment network server 108 and/or the issuer server 110.

The processor 802 executes instructions, codes, computer programs, scripts which it accesses from hard disk, floppy disk, optical disk (these various disk based systems may all be considered secondary storage 804), flash drive, ROM 806, RAM 808, or the network connectivity devices 812. While only one processor 802 is shown, multiple processors may be present. Thus, while instructions may be discussed as executed by a processor, the instructions may be executed simultaneously, serially, or otherwise executed by one or multiple processors. In an embodiment, if an App compatible with the authentication process is used, the processor 802 is configured to execute the App stored in the ROM 806 and/or RAM 808 or the secondary storage 804 for authentication of a payment transaction or an ATM transaction as described in the exemplary embodiments.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A computer implemented system for providing security and authentication in a payment transaction between a customer and a merchant, the system comprising:
   at least a computer processor and a data storage device, the data storage device comprising instructions that, when executed by the processor, configure the processor to:
      provide, to a computing device of the merchant, a graphical user interface;
      receive, from the computing device of the merchant via a computer device of an acquirer, information representing predefined parameters associated with the merchant;
      receive, from the computing device of the merchant via the graphical user interface and in response to information provided in the graphical user interface by the computing device of the merchant and via the computer device of the acquirer, information including a request for generation of a merchant token associated with a merchant;
      verify information associated with the merchant;
      generate and transmit the merchant token to the computing device of the merchant, after verifying the information associated with the merchant;
      receive, from the computing device of the merchant via the computer device of the acquirer, a payment request comprising a payment instrument associated with a customer and the merchant token;
      de-tokenize the merchant token to identify a merchant identifier associated with the merchant;
      map the merchant identifier with information in a database to identify the predefined parameters established by the merchant;
      validate the payment request by determining that the payment request meets the predefined parameters;
      approve the payment request based on the validation, by:
         transmitting, to a computing device of an issuer bank associated with the payment instrument of the customer, an issuer authorization request for payment;
         receiving, from the computing device of the issuer bank, in response to the issuer authorization request, an issuer authorization approval; and
         transmitting, to the computing device of the acquirer, information for proceeding with the secure payment transaction.

2. The computer implemented system as claimed in claim 1, wherein the payment instrument includes one of a debit card, credit card, digital wallet, or virtual payment card.

3. The computer implemented system as claimed in claim 1, wherein the data storage device comprises instructions that, when executed by the processor, configure the processor to: map the merchant identifier with information in a database to identify one or more payment channels available for the payment transaction.

4. The computer implemented system as claimed in claim 3, wherein the one or more payment channels comprise POS (Point-Of-Sale), e-commerce, m-commerce, QR, contactless, DSRP (Digital Secure Remote Payment).

5. The computer implemented system as claimed in claim 1, wherein at least one of the predefined parameters established by the merchant includes permitted values.

6. The computer implemented system as claimed in claim 1, wherein the predefined parameters established by the merchant comprise one or more of: maximum transaction value, transaction location, number of allowed transactions in a predefined period of time, maximum total value of transactions, permitted age of the customer for making the payment transaction, permitted countries for initiating the payment transaction.

7. The computer implemented system as claimed in claim 1, wherein the payment authorization request further comprises information representing customer credentials; and further wherein the data storage device comprises instructions that, when executed by the processor, configure the processor to: associated with the payment instrument with pre-registered customer details.

8. The computer implemented system as claimed in claim 7, wherein the customer credentials associated with the payment instrument comprise one or more of card number, customer name, expiry date, CVV (Card Verification Value), PIN (Personal identification Number), OTP (One Time Password), 3D secure PIN.

9. The computer implemented system as claimed in claim 1, wherein the data storage device comprises instructions that, when executed by the processor, configure the processor to: send to and receive information from the computing device of the merchant via the merchant token generation interface.

10. The computer implemented system as claimed in claim 1, wherein the merchant token is stored in a database.

11. A computer implemented method for providing security and authentication in a payment transaction between a customer and a merchant comprising the steps of:
provuding a graphical user interface to a computing device of the merchant, by at least one computing device of a payment service provider comprising a computer processor configured by executing instructions stored by a data storage device;
receiving, by the at least one computing device from the computing device of the merchant via a computer device of an acquirer bank of the merchant, information representing predefined parameters associated with the merchant;
receiving, by the at least one computing device from the computing device of the merchant via the graphical user interface and in response to information provided in the graphical user interface by the computing device of the merchant and via the computer device of the acquirer bank of the merchant, information including a request for generation of a merchant token associated with a merchant;
verifying, by the at least one computing device, information associated with the merchant;
generating and transmitting, by the at least one computing device, the merchant token to the computing device of the merchant, after verifying the information associated with the merchant;
receiving, by the at least one computing device from the computing device of the merchant via the computer device of the acquirer bank of the merchant, a payment request comprising a payment instrument associated with a customer and the merchant token;
de-tokenizing, by the at least one computing device, the merchant token to identify a merchant identifier associated with the merchant;
mapping, by the at least one computing device, the merchant identifier with information in a database to identify predefined parameters established by the merchant;
validating, by the at least one computing device, that the payment request meets the predefined parameters;
approving the payment request, by the at least one computing device, by:
transmitting, by the at least one computing device to a computing device of an issuer bank associated with the payment instrument of the customer, an issuer authorization request for payment;
receiving, by the at least one computing device from the computing device of the issuer bank, in response to the issuer authorization request, an issuer authorization approval; and
transmitting, by the at least one computing device to the computing device of the acquirer bank of the merchant, information for proceeding with the secure payment transaction.

12. The computer implemented method as claimed in claim 11, wherein the payment request is initiated at one of a merchant POS terminal, a web portal or a mobile portal of the merchant.

13. The computer implemented method as claimed in claim 11, wherein at least one of the predefined parameters as-established by the merchant includes permitted values.

14. The computer implemented method as claimed in claim 11, further comprising: providing, by the at least one computing device, a full approval if all the predefined parameters are met; providing, by the at least one computing device, a partial approval if one or more of the predefined parameters require further checking by the issuer bank; and providing, by at least one the computing device, a refusal if one or more of the predefined parameters is not met.

15. The computer implemented method as claimed in claim 11, further comprising: checking customer credentials associated with the payment instrument with pre-registered customer details by the issuer bank.

16. The computer implemented method as claimed in claim 11, wherein the merchant token interface includes one or more options fora merchant to manage the predefined parameters.

17. A non-transitory computer-readable medium having stored thereon program instructions for causing at least one processor to perform the following:
provide, to a computing device of the merchant, a graphical user interface;
receive, from the computing device of the merchant via a computer device of an acquirer, information representing predefined parameters associated with the merchant;
receive, from the computing device of the merchant via the graphical user interface and in response to information provided in the graphical user interface by the computing device of the merchant and via the computer device of the acquirer, information including a request for generation of a merchant token associated with a merchant;
verify information associated with the merchant;
generate and transmit the merchant token to the computing device of the merchant, after verifying the information associated with the merchant;
receive, from the computing device of the merchant via the computer device of the acquirer, a payment request comprising a payment instrument associated with a customer and the merchant token;
de-tokenize the merchant token to identify a merchant identifier associated with the merchant;
map the merchant identifier with information in a database to identify the predefined parameters established by the merchant;
validate the payment request by determining that the payment request meets the predefined parameters;
approve the payment request based on the validation, by:
transmitting, to a computing device of an issuer bank associated with the payment instrument of the customer, an issuer authorization request for payment;
receiving, from the computing device of the issuer bank, in response to the issuer authorization request, an issuer authorization approval; and
transmitting, to the computing device of the acquirer, information for proceeding with the secure payment transaction.

* * * * *